(No Model.)

T. T. PEARSON.
Whiffletree.

No. 230,490. Patented July 27, 1880.

Witnesses:
J. Ephraim Keith
William Bray

Thomas T. Pearson,
Inventor.
per Geo. W. McCready,
Attorney.

N. PETERS, PHOTO-LITHOGRAPHER, WASHINGTON, D.C.

UNITED STATES PATENT OFFICE.

THOMAS T. PEARSON, OF MONCTON, NEW BRUNSWICK, CANADA, ASSIGNOR OF ONE-HALF OF HIS RIGHT TO RECORD & BOYER, OF SAME PLACE.

WHIFFLETREE.

SPECIFICATION forming part of Letters Patent No. 230,490, dated July 27, 1880.

Application filed March 27, 1880. (No model.)

*To all whom it may concern:*

Be it known that I, THOMAS T. PEARSON, of the town of Moncton, in the Province of New Brunswick, Canada, have invented a new and Improved Style of Whiffletree, of which the following is a specification, and this my first application for a patent thereon.

The object which I especially aim to accomplish is safety, as the ordinary styles of whiffletree are so constructed and attached as to fail entirely in the requisite points of strength and security in proportion to the weight of material and number of separate pieces used. With fewer parts and considerably less weight I attain the desired object by the mechanism illustrated in the accompanying drawings, in which—

Figure 1:
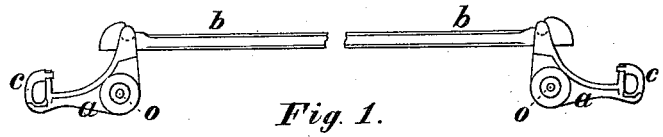
Figure 4:
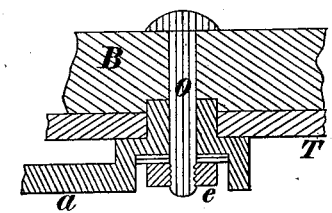
Figure 2:
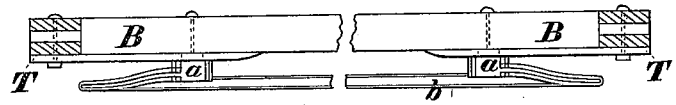
Figure 5:
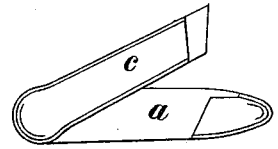
Figure 3:
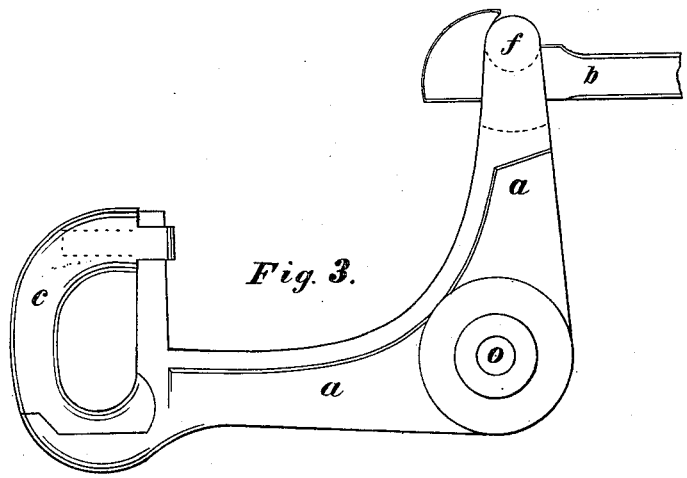
Figure 6:
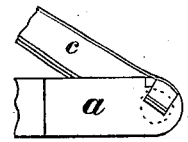
Figure 7:
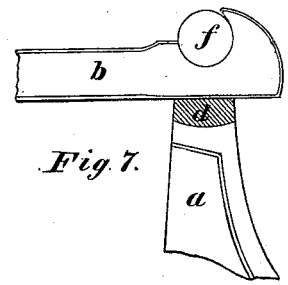

Figure 1 is a plan view of the apparatus unattached. Fig. 2 is a front view of the same attached. Fig. 3 is a top view of one of the knee-levers with safety-hook and connecting-rod attached. Fig. 4 is a vertical section through one of the pivot-joints $o$. Fig. 5 is an end view of $a$ with hook $c$ raised. Fig. 6 is an opposite view to 5, showing the hinging of $c$; and Fig. 7 shows the manner in which $a$ and $b$ are connected.

Similar letters of reference indicate corresponding parts.

The knee-levers are made in pairs, and hinged, as shown, at the fulcra or pivot-joints $o$. Each piece $a$ has one of its arms attached to the connecting-rod $b$, as will be hereinafter explained, and the other fitted with a hook, $c$, of peculiar construction, for securely holding the trace, and preventing it from becoming detached by accident.

As it is customary to fasten the shafts or thills of a carriage to the cross-bar by means of irons in the form of a T, the same being secured to the wood-work by a suitable number of screw-bolts, one pair of said bolts can conveniently be used for the pivot-joints of the knee-levers, the holes in the T-irons being enlarged for the purpose, as shown in Figs. 2 and 4. The lugs or cylindrical projections on the knee-levers being thus recessed in the T-irons, the joints are made sufficiently strong without subjecting the bolts $o$ to unnecessary strain. The pieces $a$ are also recessed (see Fig. 4) for the reception of the nuts and washers $e$.

The rear arms of the pieces $a$ are mortised, as shown in Fig. 7, the parts $f$ beyond the mortises being rounded, so as to fit in corresponding notches near the ends of the connecting-rod $b$. When the parts are put together a piece of rubber or other elastic packing, $d$, is forced into the unoccupied part of each mortise, which is enlarged within, so as to retain the packing when inserted, and thus the joints at $f$ are made almost absolutely noiseless and secure.

A safety-hook, $c$, is attached to the outer arm of each knee-lever $a$, and at its rear part in the following manner: A hole is drilled to a sufficient depth into $c$, and a corresponding pin is left upon $a$, and when they are fitted together a projecting lip upon $c$ is turned down over $a$, thus holding the hook securely in place, while a cutting away of $a$ near the pin allows a sufficient amount of angular motion. The forward end of the hook, when closed, is so notched into $a$ (see Figs. 3 and 5) as to be effectually prevented from spreading when the trace is upon it whether there is a draft or not.

It will thus be seen that by a simple and cheap arrangement of mechanical parts the ordinary casualties of traveling and hauling may be greatly reduced. Not only are the fastenings of the traces made comparatively safe, but the whiffletree itself is much stronger than the old style in proportion to its weight. Then the center of the cross-bar is relieved from the draft, which is brought to bear upon parts already made strong by the usual style of ironing, and in this manner additional points of safety are secured. Even in case of damage to the connecting-rod or its coupling with the knee-levers the draft would still come upon the pivot-points $o$, and thus the liability to accident would be almost *nil*.

Although the drawings show a draft-bar, B, to which the whiffletree is attached, it may often be required where there is no such bar, in which case it may be connected directly with the vehicle, or as the particular circumstances may require.

Having thus described my invention, I claim as new and desire to secure by Letters Patent—

1. The knee-levers $a$, provided with safety-hooks $c$, and the other several parts hereinbefore enumerated and described.

2. The combination, with the knee-levers $a$, of the connecting-rod $b$ and packing $d$, all the parts to be constructed and connected substantially as described, and for the purpose specified.

THOMAS T. PEARSON.

Witnesses:
  WM. RIPPEY,
  JOHN GILLIN.